(12) United States Patent
Ichiki et al.

(10) Patent No.: US 11,545,872 B2
(45) Date of Patent: Jan. 3, 2023

(54) MOTOR WITH BRAKE

(71) Applicant: SHINANO KENSHI KABUSHIKI KAISHA, Nagano (JP)

(72) Inventors: Koichi Ichiki, Nagano (JP); Hiroshi Uehara, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 356 days.

(21) Appl. No.: 16/880,025

(22) Filed: May 21, 2020

(65) Prior Publication Data
US 2021/0006125 A1 Jan. 7, 2021

(30) Foreign Application Priority Data
Jul. 1, 2019 (JP) .............................. JP2019-122699

(51) Int. Cl.
| | | |
|---|---|---|
| H02K 7/102 | (2006.01) |
| H02K 7/104 | (2006.01) |
| H02K 7/116 | (2006.01) |
| H02K 11/30 | (2016.01) |
| F16D 65/18 | (2006.01) |
| F16D 63/00 | (2006.01) |
| F16D 121/22 | (2012.01) |
| F16D 121/20 | (2012.01) |

(52) U.S. Cl.
CPC ........... *H02K 7/104* (2013.01); *F16D 63/006* (2013.01); *F16D 65/18* (2013.01); *H02K 7/116* (2013.01); *H02K 11/30* (2016.01); *F16D 2121/20* (2013.01); *F16D 2121/22* (2013.01)

(58) Field of Classification Search
CPC ............ H02K 7/10; H02K 7/12; H02K 7/104; H02K 7/116; H02K 7/102; F16D 65/18
USPC ...... 188/67, 72.1, 72.3, 72.6–72.8, 156–164, 188/187
See application file for complete search history.

(56) References Cited

U.S. PATENT DOCUMENTS

| | | | | |
|---|---|---|---|---|
| 10,300,397 | B2 * | 5/2019 | Diehl ................... | H02K 49/043 |
| 2003/0184177 | A1 * | 10/2003 | Enzinna ................ | H02K 7/125 |
| | | | | 310/93 |

FOREIGN PATENT DOCUMENTS

| | | | | | |
|---|---|---|---|---|---|
| DE | 102009051499 | A1 * | 5/2011 | ........... | H02K 7/1028 |
| DE | 102013013375 | A1 * | 2/2015 | ............ | B60T 13/741 |
| JP | H05252800 | | * | 9/1993 | ............. H02P 15/00 |
| JP | 2016127611 | | | 7/2016 | |
| JP | 2020158043 | | | 10/2020 | |
| WO | WO-2016024319 | | | 2/2016 | |

OTHER PUBLICATIONS

Notice of Reasons for Refusal dated Mar. 9, 2021 in Japanese Application No. 2019-122699.

* cited by examiner

*Primary Examiner* — Christopher P Schwartz
(74) *Attorney, Agent, or Firm* — Stephen J. Weyer, Esq.; Stites & Harbison, PLLC (57) ABSTRACT

A controller controls switching between a braked state in which a movable meshing part 7 comes close to and meshes with a motor meshing part 6 and a brake released state in which the movable meshing part 7 is separated from the motor meshing part 6.

5 Claims, 8 Drawing Sheets

SECTION Y-Y

SECTION X-X

MOTOR WITH BRAKE

CROSS-REFERENCE TO RELATED APPLICATION

This application is based upon and claims the benefit of priority of the prior Japanese Patent Application No. 2019-122699, filed on Jul. 1, 2019, and the entire contents of which are incorporated herein by reference.

TECHNICAL FIELD

The present invention relates to a motor with a brake including a brake mechanism provided with a motor meshing part provided in a motor shaft and a movable meshing part arranged opposite to the motor meshing part, which advances and retracts in an axial direction.

BACKGROUND ART

There is proposed a motor with a brake including a brake that applies a braking force to the motor shaft so as to obtain a higher braking force. The motor with the brake generates the braking force by allowing a first plate (friction plate) integrally rotating with the motor shaft to contact a second plate by a plate driving mechanism. The second plate is provided with a rotation block mechanism that blocks rotation about a motor axial line so that the first plate and the second plate are brought into contact with each other at portions on an outer side as far as possible in a radial direction to thereby generate the braking force (refer to PTL 1: JP-A-2016-127611).

SUMMARY OF INVENTION

Technical Problem

The above motor with the brake has the configuration in which the first plate and the second plate are brought into contact with each other at portions on the outer side as far as possible in the radial direction to generate a higher braking force, which is not suitable for reducing the size of the motor with the brake as the braking force depends on a contact area.

Additionally, a linear motion mechanism such as a solenoid is provided as the plate driving mechanism so that a power feed operation to the motor as well as a power feed operation to the solenoid are performed. That is, power is not fed to the solenoid when the power feed to the motor is stopped; therefore, the second plate is pressed onto the first plate due to biasing of a coil spring to apply a brake. As power is fed to the solenoid when power is fed to the motor, the second plate is separated from the first plate against biasing of the coil spring to release the brake. Accordingly, the power feed to the plate driving mechanism continues during driving of the motor, which increases power consumption.

In response to the above issue, one or more aspects of the present invention are directed to a motor with a brake, which is capable of realizing size reduction without reducing the braking force and capable of reducing power consumption.

Solution to Problem

The disclosure concerning some embodiments described below has at least the following structures.

A motor with a brake includes a motor driven to rotate about a motor shaft, a reduction gear rotating an output shaft with reduced speed about an input shaft drive-transmitted from the motor shaft through a gear mechanism, a brake mechanism including a motor meshing part integrally provided at the motor shaft on an opposite side of the reduction gear in an axial direction and a movable meshing part arranged opposite to the motor meshing part so as to be in contact with or separated from the motor meshing part, and a controller controlling a rotation operation of the motor and a braking operation of the brake mechanism, in which the controller controls switching between a braked state in which the movable meshing part comes close to and meshes with the motor meshing part and a brake released state in which the movable meshing part is separated from the motor meshing part.

The controller controls switching between the braked state in which the movable meshing part comes close to and meshes with the motor meshing part and the brake released state in which the movable meshing part is separated from the motor meshing part as described above, thereby realizing size reduction of the motor with the brake without reducing the braking force even when a motor diameter is reduced.

It is preferable that the controller starts the motor through a motor controller in the brake released state in which the movable meshing part is separated from the motor meshing part, and executes the braking operation in which the movable meshing part of the brake mechanism is pressed onto the motor meshing part through a brake controller after transmitting an instruction for stopping motor rotation in a state in which the motor reaches a specified torque.

As the movable meshing part is pressed onto the motor meshing part while reducing the rotation speed of the motor as described above, the braking force can be applied efficiently without damaging respective meshing parts.

The brake mechanism may be an electromagnetic brake mechanism provided with a movable yoke with which the movable meshing part is integrally formed, a pair of fixed yokes in which both-side leg parts each having a U-shaped cross section are arranged so as to face the movable yoke through a gap, permanent magnets respectively arranged to parts of the respective fixed yokes so that same magnetic poles face each other, and a pair of coils wound in the same direction and arranged opposite to each other between the both-side leg parts of the respective fixed yokes so that air-core parts face the movable yoke, and the magnitude of attractive forces of the both-end leg parts of the pair of fixed yokes may be changed by energizing at least any of the pair of coils to move the movable yoke with the movable meshing part in the axial direction and to perform switching between the state in which the movable meshing part meshes with the motor meshing part and the state in which the movable meshing part is separated from the motor meshing part.

When the electromagnetic brake mechanism is adopted as the brake mechanism as described above, a magnetic circuit holding a position in the axial direction of the movable meshing part integrally assembled with the movable yoke by the permanent magnet is constantly formed; therefore, the position in the axial direction of the movable meshing part can be changed by energizing at least any of the pair of coils for a short period of time at the time of releasing the brake and at the time of operating the brake, which can realize power saving.

The meshing between the movable meshing part and the motor meshing part may be released or the movable meshing part may mesh with the motor meshing part by energizing the first coil and the second coil at the same time or selectively. When the first coil and the second coil are energized at the same time or selectively for a short period of time as described above, the position in the axial direction of the movable meshing part can be changed and held, which can promote power saving.

A plurality of recessed parts and projecting parts may be provided on facing surfaces of the movable meshing part and the motor meshing part at a fitting angle θ in a circumferential direction, and the controller may check the fitting between the recessed parts and the projecting parts by detecting a rotation of a prescribed angle Δ smaller than the fitting angle θ by the motor controller after the controller instructs the braking operation to the brake mechanism through the brake controller.

According to the above, in the case where the plural recessed parts and projecting parts are provided on facing surfaces of the movable meshing part and the motor meshing part at the fitting angle θ, the operation of checking whether the movable meshing part positively meshes with the motor meshing part or not can be performed, and the braking operation can be positively performed.

Advantageous Effects of Invention

It is possible to provide the motor with the brake, which is capable of realizing size reduction without reducing the braking force and capable of reducing power consumption.

DESCRIPTION OF EMBODIMENTS

Hereinafter, an embodiment of a motor with a brake according to the present disclosure will be explained with reference to the attached drawings. First, a schematic structure of the motor with the brake will be explained with reference to FIGS. 1A to 1D and FIG. 2.

Figures 1A, 1B, 1C, 1D:
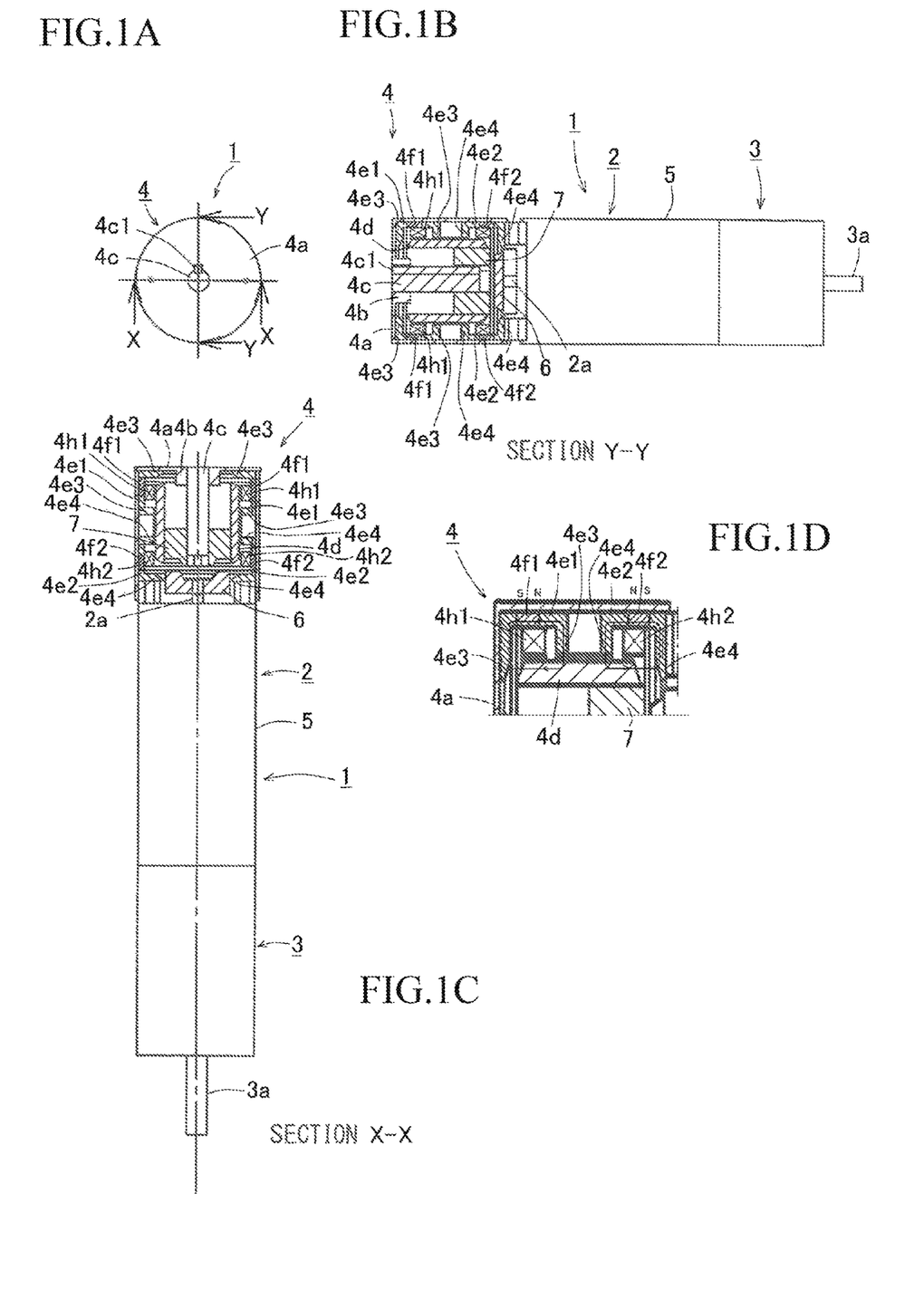
FIG. 1A is a side view on an output side of a motor with a brake.
FIG. 1B is a partial cross-sectional view from a direction of arrows Y-Y of FIG. 1A.
FIG. 1C is a partial cross-sectional view from a direction of arrows X-X of FIG. 1A.
FIG. 1D is a partial enlarged cross-sectional view of FIG. 1B.

As shown in FIG. 1A to 1C, a motor with a brake 1 is provided with a motor 2, a reduction gear 3 on an output side thereof in an axial direction, and a brake mechanism 4 on a non-output side in the axial direction.

As for the motor 2, for example, a DC brushless motor is used, and an inner-rotor type motor is used in the embodiment. A stator is assembled inside a housing 5. In the stator, coils are wound around plural pole teeth provided to stand toward an inner side of a stator core in a radial direction through insulators. A motor substrate for controlling the coils to be energized is provided in the housing 5. Lead wires drawn out from the coils are connected to the motor substrate. A rotor is provided on the inner side of the stator in the radial direction. In the rotor, rotor magnets are integrally assembled to a motor shaft 2a. The rotor magnets are alternately magnetized to N-poles and S-poles in a circumferential direction and arranged so as to face the pole teeth of the stator core.

The reduction gear mechanism 3 (shown schematically in FIG. 1) rotates an output shaft 3a with reduced speed through a gear mechanism around an input shaft drive-transmitted from the motor shaft 2a. In accordance with its schematic depiction in FIG. 1, the reduction gear mechanism 3 may be a trochoidal type reduction gear in which plural external gears forming a trochoidal gear shape around an eccentric shaft as the input shaft revolve about the eccentric shaft along an internal gear, and decelerated rotational movement of the external gears is transmitted to the output shaft 3a. The reduction gear mechanism 3 may also be a planetary gear mechanism in which a sun gear as the input shaft is provided and plural external gears revolve about the sun gear along an internal gear, and decelerated rotational movement of the external gears is transmitted to the output shaft 3a.

A motor meshing part 6 is integrally provided at the motor shaft 2a on an opposite side of the reduction gear 3 in the axial direction. As for the brake mechanism 4, an electromagnetic brake mechanism provided with a movable meshing part 7 arranged opposite to the motor meshing part 6 so as to be in contact with or separated from the motor meshing part 6 in the axial direction is used. A boss section 4b is provided at an inner end of a brake housing 4a. A guide shaft 4c is fitted to a cylindrical hole of the boss section 4b. The movable meshing part 7 is assembled about the guide shaft 4c so as to slide in the axial direction. A movable yoke 4d formed in an annular shape is integrally assembled to an outer periphery of the movable meshing part 7. A pair of a first fixed yoke 4e1 and a second fixed yoke 4e2 are provided in the brake housing 4a so as to surround the movable yoke 4d. Respective fixed yokes 4e1, 4e2 are arranged so that both leg parts (a first leg part 4e3, a second leg part 4e4) each formed in a U-shaped cross section in the radial direction face the movable yoke 4d through a gap part to thereby form an annular magnetic path.

As shown in FIG. 1B and FIG. 1C, permanent magnets 4f1, 4f2 are respectively assembled to parts of the first and second fixed yokes 4e1, 4e2 so that same magnetic poles of the permanent magnets 4f1, 4f2 face each other. A first coil 4h1 and a second coil 4h2 wound in the same direction are arranged opposite to each other so that air-core parts face the movable yoke 4d between the both leg parts (the first leg part 4e3, a second leg part 4e4) of the first and second fixed yokes 4e1, 4e2. The first and second coils 4h1, 4h2 are coils wound in the same direction, and magnetic paths are also generated in the same direction when energizing respective coils 4h1, 4h2. As described later, the magnitude of attractive forces of the first leg part 4e3 of the first fixed yoke 4e1 and the second leg part 4e4 of the second fixed yoke 4e2 is changed by switching energizing of the first coil 4h1 and the second coil 4h2, thereby moving the movable yoke 4d in the axial direction.

FIG. 1D is a partial enlarged cross-sectional view of the brake mechanism 4 in FIG. 1B. When the permanent magnets 4f1, 4f2 are respectively arranged at parts of the fixed yokes 4e1, 4e2 so that directions of magnetic poles are opposite to each other (for example, so that N-poles face each other) as shown in FIG. 1D, a magnetic path extending in a clockwise direction is formed by the permanent magnet 4f1 of the first fixed yoke 4e1 and a magnetic path extending in a counterclockwise direction is formed by the permanent magnet 4f2 of the second fixed yoke 4e2 respectively between the first and second fixed yokes 4e1, 4e2 and the movable yoke 4d.

For example, when the first coil 4h1 is energized in a direction in which a magnetic flux in the clockwise direction is generated, the magnetic path of the permanent magnet 4f1 is superimposed on the magnetic path of the first coil 4h1 as the magnetic path of the permanent magnet 4f1 extends in the clockwise direction; therefore, the magnetic flux passing through the first leg part 4e3 of the first fixed yoke 4e1 is increased, then, the movable yoke 4d is attracted to the first leg part 4e3 and the movable meshing part 7 is moved to a left side in the axial direction (left side in FIG. 1B). Even the second coil 4h2 is also energized in the same manner, the magnetic path of the permanent magnet 4f2 cancels out the magnetic path of the second coil 4h2 as the magnetic path of the permanent magnet 4f2 extends in the counterclockwise direction; therefore, the magnetic flux passing through the second leg part 4e4 is reduced, and the moving direction of the movable yoke 4d is not changed.

When the second coil 4h2 is energized in a direction in which a magnetic flux in the counterclockwise direction is generated, the magnetic path of the permanent magnet 4f2 is superimposed on the magnetic path of the second coil 4h2 as the magnetic path of the permanent magnet 4f2 extends in the counterclockwise direction; therefore, the magnetic flux passing through the second leg part 4e4 of the second fixed yoke 4e2 is increased, then, the movable yoke 4d is attracted to the second leg part 4e4 and the movable meshing part 7 is moved to a right side in the axial direction (right side in FIG. 1B). Even when the first coil 4h1 is also energized in the same manner, the magnetic path of the permanent magnet 4f1 cancels out the magnetic path of the first coil 4h1 as the magnetic path of the permanent magnet 4f1 extends in the clockwise direction; therefore, the magnetic flux passing through the first leg part 4e3 is reduced, and the moving direction of the movable yoke 4d is not changed.

When energizing of the first coil 4h1 or the second coil 4h2 is stopped after the movable yoke 4d is attracted to the first leg part 4e3 or the second leg part 4e4 and the movable meshing part 7 moves to the left side in the axial direction or the right side in the axial direction, the movable meshing part 7 is held at the position as the permanent magnets 4f1, 4f2 and the movable yoke 4d attract each other. That is, the brake mechanism 4 consumes power only at a moment when the movable meshing part 7 is moved; therefore, reduction of power consumption can be promoted.

The magnetic flux of the first leg part 4e3 of the first fixed yoke 4e1 is increased when the first coil 4h1 is energized in the direction in which the magnetic flux in the clockwise direction is generated in FIG. 1D; therefore, the movable yoke 4d is attracted to the first leg part 4e3 and the movable yoke 4d moves to the left side in the axial direction of FIG. 1B (an upper direction in the axial direction of FIG. 1C). As the movable meshing part 7 is separated from the motor meshing part 6 at this time, the brake becomes in a released state.

The magnetic flux of the second leg part 4e4 of the second fixed yoke 4e2 is increased when the second coil 4h2 is energized in the direction in which the magnetic flux in the counterclockwise direction is generated in FIG. 1D; therefore, the movable yoke 4d is attracted to the second leg part 4e4 and the movable yoke 4d moves to the right side in the axial direction of FIG. 1B (an lower direction in the axial direction of FIG. 1C). As the movable meshing part 7 approaches the motor meshing part 6 and a projecting part 7a meshes with a recessed part 6a, the brake becomes in an operated state.

As described above, the first coil 4h1 and the second coil 4h2 are energized at the same time or selectively, thereby changing the magnitude of attractive forces of the first leg part 4e3 of the first fixed yoke 4e1 and the second leg part 4e4 of the second fixed yoke 4e2 and moving the movable yoke 4d in the axial direction with the movable meshing part 7 to perform switching between the braked state in which the movable meshing part 7 meshes with the motor meshing part 6 and the brake released state in which the movable meshing part 7 is separated from the motor meshing part 6.

Figure 2:
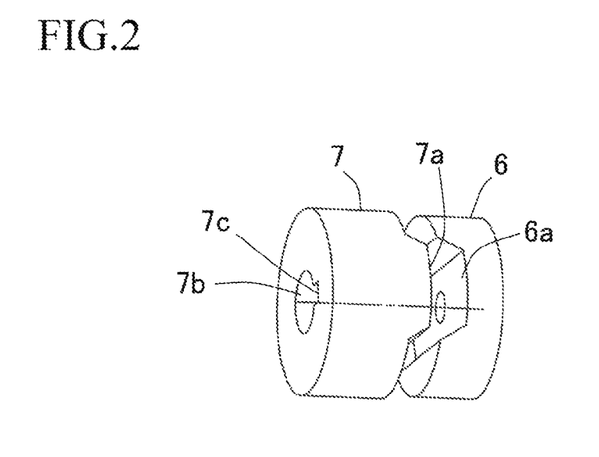
FIG. 2 is a perspective view of a movable meshing part and a fixed meshing part.

FIG. 2 shows an example of the movable meshing part 7 and the motor meshing part 6. The motor meshing part 6 is integrally assembled to the motor shaft 2a so as not to rotate. The movable meshing part 7 is assembled so as to slide about the guide shaft 4c. The recessed part 6a is provided on an end surface in the radial direction of the motor meshing part 6. The projecting part 7a is provided on an opposite surface in the radial direction of the movable meshing part 7 facing the recessed part 6a. When the recessed part 6a meshes with the projecting part 7a, the braked state in which rotation of the motor shaft 2a is stopped is obtained. The recessed part 6a is a groove continuing in the radial direction and the projecting part 7a is formed in one tooth continuing in the radial direction; however, these are not limited to the shapes. Groove side surfaces of the recessed part 6a and both side surfaces of the projecting part 7a facing the groove side surfaces may be formed in slanted surfaces for realizing smooth meshing. As shown in FIGS. 1A and 1B, a key 4c1 is fitted to an outer peripheral surface of the guide shaft 4c along an axial line. A key groove 7c is provided in a shaft hole 7b of the movable meshing part 7 as shown in FIG. 2. The movable meshing part 7 is assembled so as to slide in the axial direction in a state in which the guide shaft 4c is inserted into the shaft hole 7b and the key 4c1 is fitted to the key groove 7c so as not to rotate.

Figure 3:
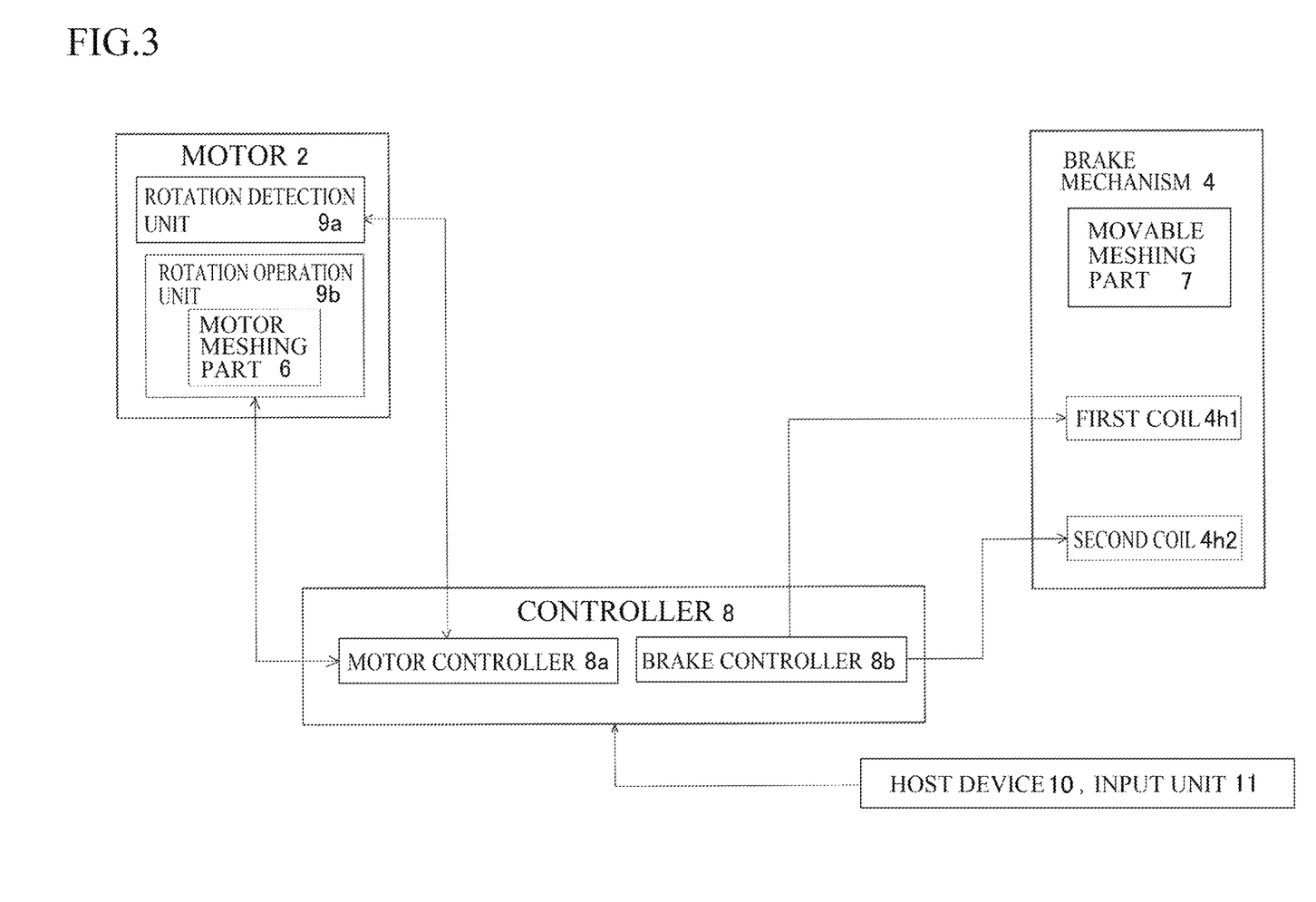
FIG. 3 is a block structure diagram of a control system of the motor with the brake.

An example of a controller for controlling a braking operation of the brake mechanism 4 will be explained with reference to a block structure diagram shown in FIG. 3. A controller 8 controls the operation of the motor with the brake 1, including a motor controller 8a and a brake controller 8b. The motor controller 8a controls the operation of the motor 2. The motor 2 (motor substrate) is provided with a rotation detection unit 9a detecting a rotation speed of the rotor and a rotation operation unit 9b operating the rotor to rotate by switching energizing of the motor coils provided in the stator. Command values such as a rotation command and a specified torque command are inputted to the controller 8 from a host device 10 or an input unit 11.

The brake controller 8b energizes the first coil 4h1 and the second coil 4h2 in the motor stop state to start the motor 2 in the brake released state in which the movable meshing part 7 is separated from the motor meshing part 6. The motor controller 8a switches energizing of the motor coils so as to bias the rotation of the rotor through the rotation operation unit 9b. When the motor controller 8a monitors a rotation torque and the rotation detection unit 9a detects reduction of the motor rotation speed in a state of reaching a specified torque, the motor controller 8a energizes the first coil 4h1 and the second coil 4h2 to be in the braked state in which the movable meshing part 7 is pressed onto the motor meshing part 6.

Figure 4:
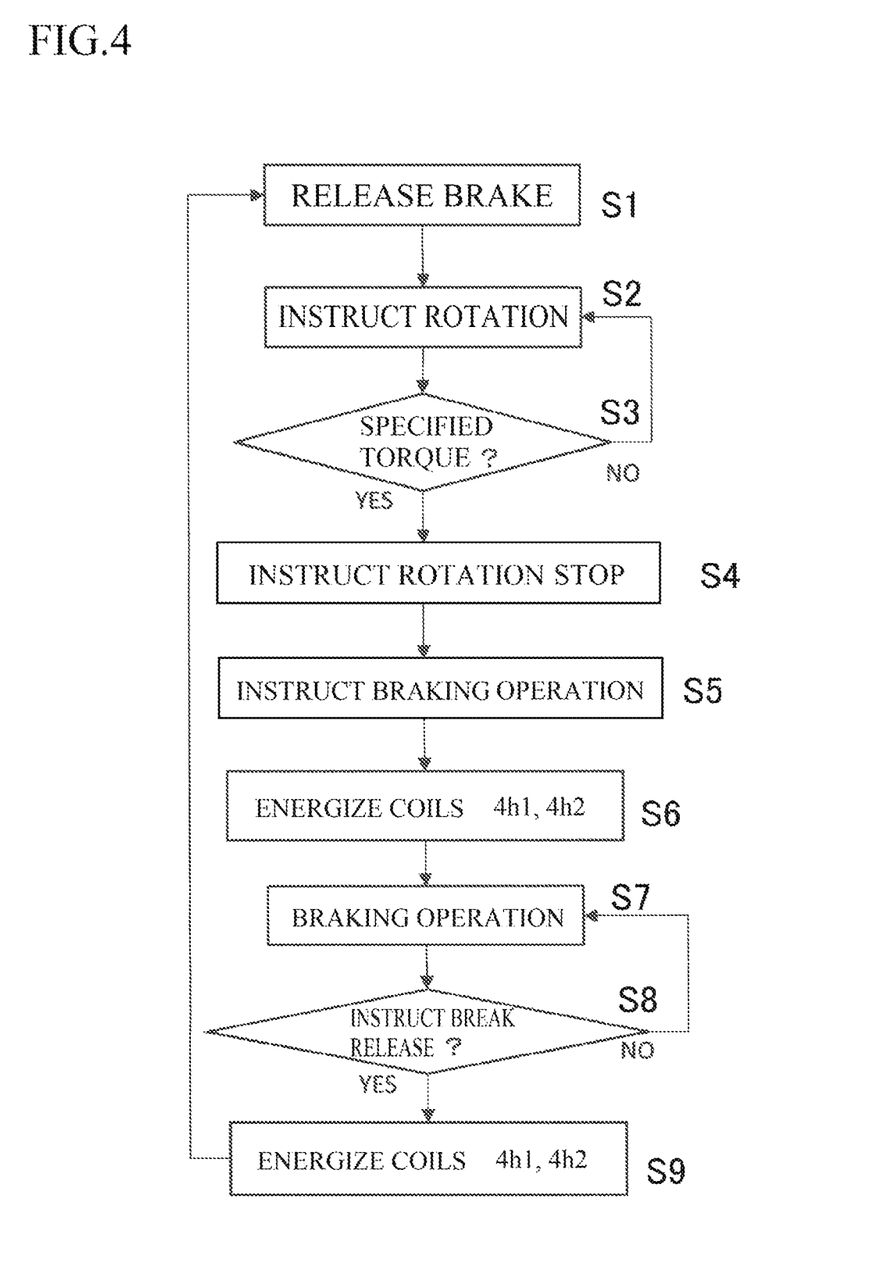
FIG. 4 is a flow chart showing an example of a braking operation.
Figure 5:
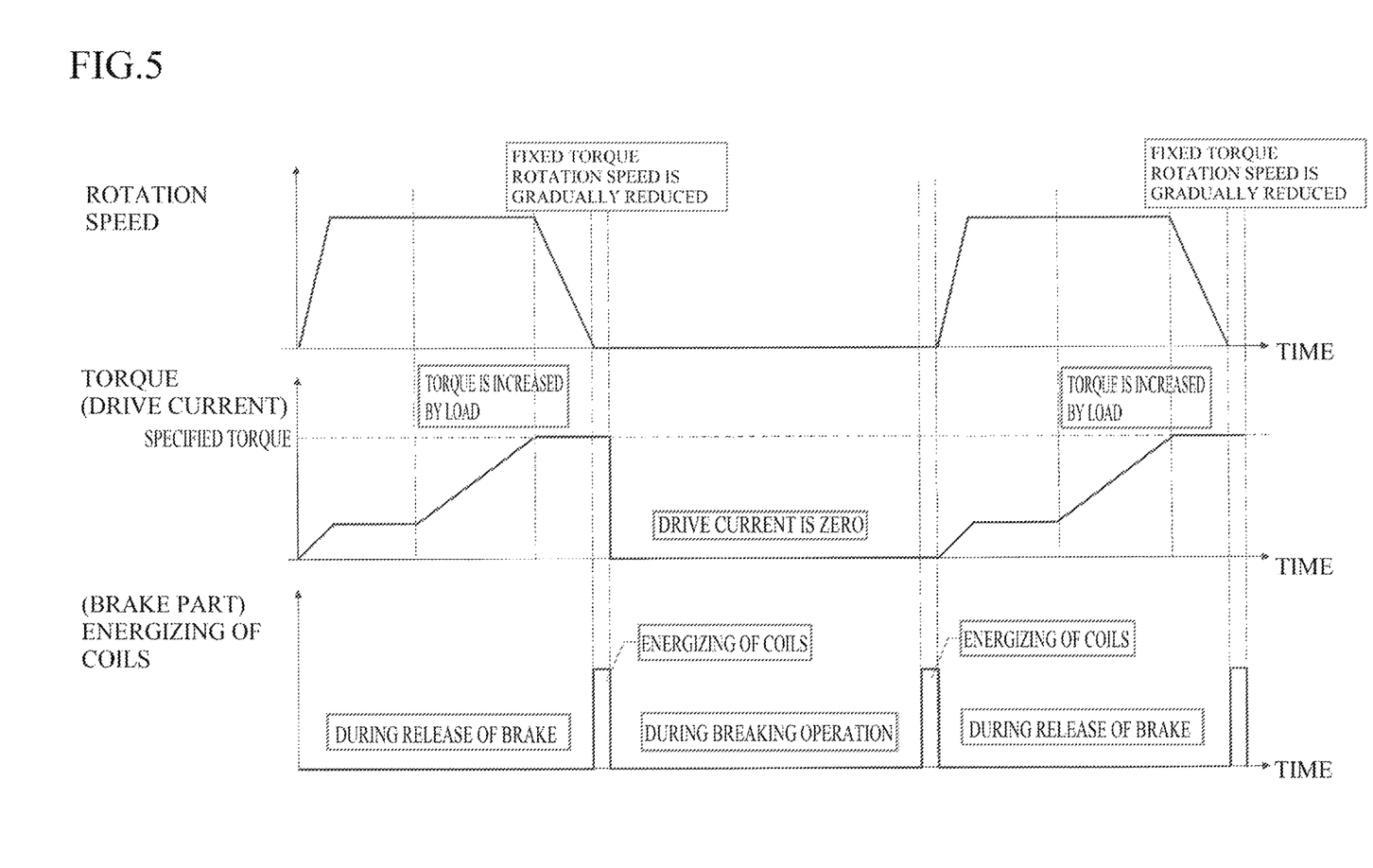
FIG. 5 is a timing chart showing the example of the braking operation.

Here, an example of the control operation of the motor with the brake 1 by the controller 8 will be explained along a flow chart shown in FIG. 4 and with reference to a timing chart shown in FIG. 5. Before starting the motor 2, the controller 8 releases the brake of the brake mechanism 4 by the brake controller 8b. That is, the brake controller 8b energizes the first coil 4h1 and the second coil 4h2 of the brake mechanism 4 for a prescribed period of time in a prescribed direction. At this time, the movable yoke 4d is attracted to the leg part 4e3 of the first fixed yoke 4e1 and the movable meshing part 7 moves along the guide shaft 4c to be in a position separated from the motor meshing part 6 in the axial direction as shown in FIG. 1D (Step S1). As the movable meshing part 7 is attracted and held by a magnetic circuit formed by the permanent magnet 4f1 provided in the first fixed yoke 4e1, it is not necessary to continue energizing the first coil 4h1 and the second coil 4h2.

When the rotation command is transmitted from the host device 10 or the input unit 11, the controller 8 transmits a rotation instruction to the rotation operation unit 9b through the motor controller 8a (Step S2). The rotation operation unit 9b switches energizing of the motor coils so as to increase the rotation speed of the rotor. Accordingly, the rotation speed of the motor is increased and the torque is increased by a load as shown in FIG. 5.

The motor controller 8a monitors the torque by detecting a load current of the motor 2 and converting the current into the torque and determines whether the torque reaches the specified torque or not (step S3). The specified torque is not always the maximum torque in the performance of the motor 2 and differs according to specifications of the host device 10 to be connected. As shown in FIG. 5, the rotation speed of the motor is gradually reduced from a fixed state by the load when reaching the specified torque. The reduction of the rotation speed is detected by the rotation detection unit 9a. When the torque reaches the specified torque, the motor controller 8a transmits a rotation stop instruction to the rotation operation unit 9b for suppressing power consumption of the motor (Step S4). At this time, the motor 2 gradually reduces the rotation speed while maintaining the specified torque, and therefore, the motor 2 is not reversely rotated. When the torque does not reach the specified torque in Step S3, the motor controller 8a continues transmitting the rotation instruction to the rotation operation unit 9b (Step S2).

Subsequently, the controller 8 instructs the brake controller 8b to perform the braking operation (Step S5). The brake controller 8b energizes the first coil 4h1 and the second coil 4h2 of the brake mechanism 4 for the prescribed period of time (Step S6). At this time, the movable yoke 4d is attracted to the second leg 4e4 of the second fixed yoke 4e2, the movable meshing part 7 moves along the guide shaft 4c and pressed onto the motor meshing part 6, then, the projecting part 7a meshes with the recessed part 6a to thereby execute the braking operation (Step S7). As shown in FIG. 5, the movable meshing part 7 is held while being meshed with the motor meshing part 6 by a magnetic circuit formed by the permanent magnet 4f2; therefore, the motor rotation speed becomes zero, and the rotation torque also becomes zero. As the movable meshing part 7 is attracted and held by the magnetic circuit formed by the permanent magnet 4f2 provided in the second fixed yoke 4e2, it is not necessary to continue energizing the first coil 4h1 and the second coil 4h2. It is desirable that the instruction for the braking operation is executed after the rotation stop instruction. That is because there is a danger of damage to the meshing parts unless the movable meshing part 7 is pressed onto the motor meshing part 6 while reducing the rotation speed of the motor 2.

Here, the controller 8 determines about the necessity of releasing the brake (Step S8). Specifically, when the operation command is transmitted from the host device 10 or the input unit 11, a brake release operation is instructed to the brake controller 8b. The brake controller 8b energizes the first coil 4h1 and the second coil 4h2 of the brake mechanism 4 for a prescribed period of time (Step S9). At this time, the movable yoke 4d is attracted to the leg part 4e3 of the first fixed yoke 4e1, and the movable meshing part 7 moves along the guide shaft 4c and separated from the motor meshing part 6 as shown in FIG. 1D, thereby performing the brake release operation (Step S1). As the movable meshing part 7 is attracted and held by the magnetic circuit formed by the permanent magnet 4f1 provided in the first fixed yoke 4e1, it is not necessary to continue energizing the first coil 4h1 and the second coil 4h2. It is also possible to check the release of the brake by transmitting the rotation command to the rotation operation part 9b from the motor controller 8a to temporarily rotate the motor 2 forwardly and reversely.

As explained in Steps S1 to S8, the controller 8 transmits the rotation instruction to the rotation operation unit 9b through the motor controller 8a, and the rotation operation unit 9b switches energizing of the motor coils so as to increase the rotation speed of the rotor. Accordingly, the rotation speed of the motor is increased and the torque is increased by the load as shown in FIG. 5. The motor controller 8a monitors the torque by detecting the load current and determines whether the torque is increased and reaches the specified torque or not, then, the braking operation is executed by the brake controller 8b according to need.

It is sufficient that the brake mechanism 4 energizes the first and second coils 4h1, 4h2 for a short period of time at the time of releasing the brake and operating the brake when switching the position of the movable meshing part 7 in the axial direction as described above; therefore, power can be saved. Furthermore, it is possible to prevent the movable meshing part 7 and the motor meshing part 6 from being damaged as the brake mechanism 4 is operated by the brake controller 8b after transmitting the rotation stop instruction of the motor to the rotation operation unit 9b.

Next, another example of the motor with the brake 1 will be explained with reference to FIG. 6 to FIG. 8. As a schematic structure of the motor with brake 1 is the same as that of FIG. 1, different contents in the structure of the brake mechanism 4 and the control operation will be mainly explained.

Figure 6:
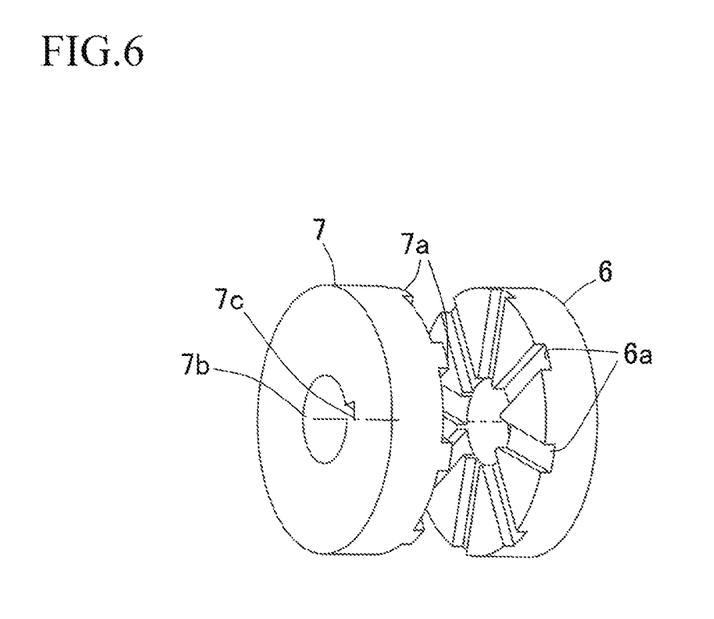
FIG. 6 is a perspective view of the movable meshing part and the fixed meshing part according to another example.
Figures 7A, 7B:
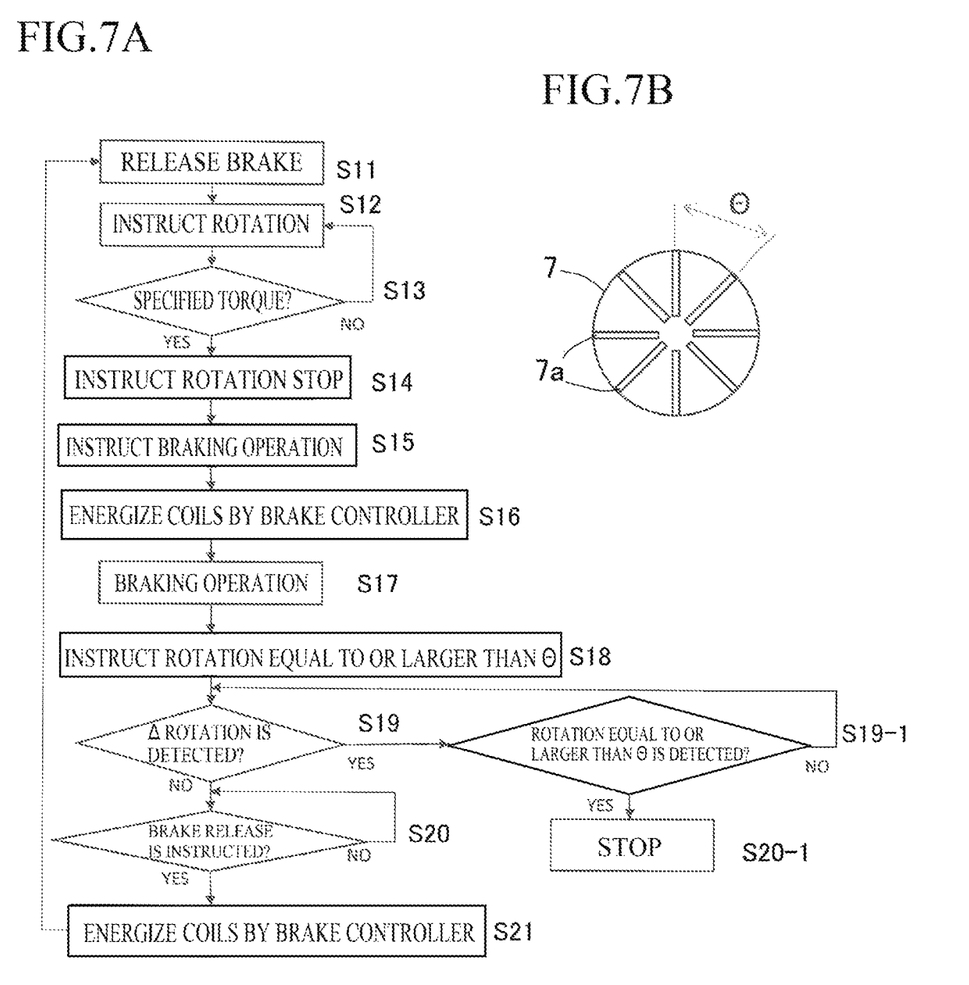
FIG. 7A is a flow chart showing an example of the braking operation according to another example.
FIG. 7B is a view showing a fitting angle θ.

FIG. 6 is a perspective view of the movable meshing part 7 and the motor meshing part 6 according to another example. Recessed parts 6a extending in the radial direction are formed at eight places at intervals of 45 degrees (refer to a fitting angle θ in FIG. 7B) in the circumferential direction on an end surface of the motor meshing part 6. Projecting parts 7a extending in the radial direction are formed at eight places at intervals of 45 degrees in the circumferential direction on a facing surface of the movable meshing part 7. The movable meshing part 7 moves in the axial direction and approaches the motor meshing part 6 by the braking operation of the brake mechanism 4, then, the projecting parts 7a are fitted to the recessed parts 6a, thereby executing the braking operation.

The fitting angle θ between the recessed parts 6a and the projecting parts 7a to be fitted to each other is set to 45 degrees; however, the angle θ may be larger (for example, θ=60°, 90° and the like) or smaller (for example, θ=30°, 15° and the like) than 45 degrees.

Here, an example of the control operation of the motor with the brake 1 by the controller 8 will be explained along a flow chart shown in FIG. 7A with reference to a timing chart shown in FIG. 8. Before starting the motor 2, the controller 8 releases the brake of the brake mechanism 4 by the brake controller 8b. That is, the brake controller 8b energizes the first coil 4h1 and the second coil 4h2 of the brake mechanism 4 for a prescribed period of time. At this time, the movable yoke 4d is attracted to the leg part 4e3 of the first fixed yoke 4e1 and the movable meshing part 7 moves along the guide shaft 4c to be in a position separated from the motor meshing part 6 in the axial direction as shown in FIG. 1D (Step S11). As the movable meshing part 7 is attracted and held by the magnetic circuit formed by the permanent magnet 4f1 provided in the first fixed yoke 4e1, it is not necessary to continue energizing the first coil 4h1 and the second coil 4h2.

When the rotation command is transmitted from the host device 10 or the input unit 11, the controller 8 transmits the rotation instruction to the rotation operation unit 9b through the motor controller 8a (Step S12). The rotation operation unit 9b switches energizing of the motor coils so as to increase the rotation speed of the rotor. Accordingly, the rotation speed of the motor is increased and the torque is increased by the load as shown in FIG. 8.

The motor controller 8a monitors the torque by detecting a load current of the motor 2 and converting the current into the torque and determines whether the torque reaches the specified torque or not (Step S13). The specified torque is not always the maximum torque in the performance of the motor 2 and differs according to specifications of the host device 10 to be connected. As shown in FIG. 8, the rotation speed of the motor is gradually reduced from the fixed state by the load when reaching the specified torque. The reduction of the rotation speed is detected by the rotation detection unit 9a. When the torque reaches the specified torque, the motor controller 8a transmits the rotation stop instruction to the rotation operation unit 9b for suppressing power consumption of the motor (Step S14). At this time, the motor 2 gradually reduces the rotation speed while maintaining the specified torque, the motor 2 is not reversely rotated. When the torque does not reach the specified torque in Step S13, the motor controller 8a continues transmitting the rotation instruction to the rotation operation unit 9b (Step S12).

Subsequently, the controller 8 instructs the brake controller 8b to perform the braking operation (Step S15). The brake controller 8b energizes the first coil 4h1 and the second coil 4h2 of the brake mechanism 4 for the prescribed period of time (Step S16). At this time, the movable yoke 4d is attracted to the second leg 4e4 of the second fixed yoke 4e2, the movable meshing part 7 moves along the guide shaft 4c and pressed onto the motor meshing part 6 as shown in FIG. 1D, then, the projecting parts 7a mesh with the recessed parts 6a to thereby execute the braking operation (Step S17).

Here, an operation for checking whether the movable meshing part 7 positively meshes with the motor meshing part 6 or not is performed. That is, the motor controller 8a instructs a rotation equal to or larger than the fitting angle θ at the meshing parts with respect to the rotation operation unit 9b (Step S18). A motor rotation direction may be either a forward rotation direction or a reverse rotation direction. As the specified torque in Step S13 is not always the maximum torque in motor specifications, the motor can be rotated in the previous rotation direction.

Next, the rotation detection unit 9a detects whether the motor 2 has rotated by a prescribed angle Δ that is smaller than the fitting angle θ or not (Step S19). The projecting parts 7a mesh with the recessed parts 6a when the motor does not rotate by the prescribed angle Δ. The projecting parts 7a do not mesh with the recessed parts 6a when the motor rotates by the prescribed angle Δ or more. The prescribed angle Δ is determined in consideration of some mechanical play between the projecting part 7a and the recessed part 6a and product specifications. Incidentally, the movable yoke 4d continues being attracted to the direction in which the braking operation is performed by the permanent magnet 4f2 (the right direction in FIG. 1D) after Step S16. Therefore, even when the projecting parts 7a do not overlap with and mesh with the recessed parts 6a in the axial direction, the projecting parts 7a can mesh with the recessed parts 6a and move in the axial direction (braking operation) while the motor is rotated by the fitting angle θ.

In a case where the prescribed angle Δ is detected in Step S19, whether the rotation equal to or larger than the fitting angle θ has been performed or not is detected (Step S19-1). When the rotation does not reach the rotation equal to or larger than the fitting angle θ, the process returns to the determination whether the rotation of the prescribed angle Δ is detected or not in Step S19. When the rotation reaches the rotation equal to or larger than the fitting angle θ, the rotation instruction in Step S18 is stopped due to occurrence of an abnormality in the motor with the brake (S20-1). An integrating counter function of the rotation angle may be provided in the controller 8; however, it may be provided in the rotation detection unit 9a.

Figure 8:
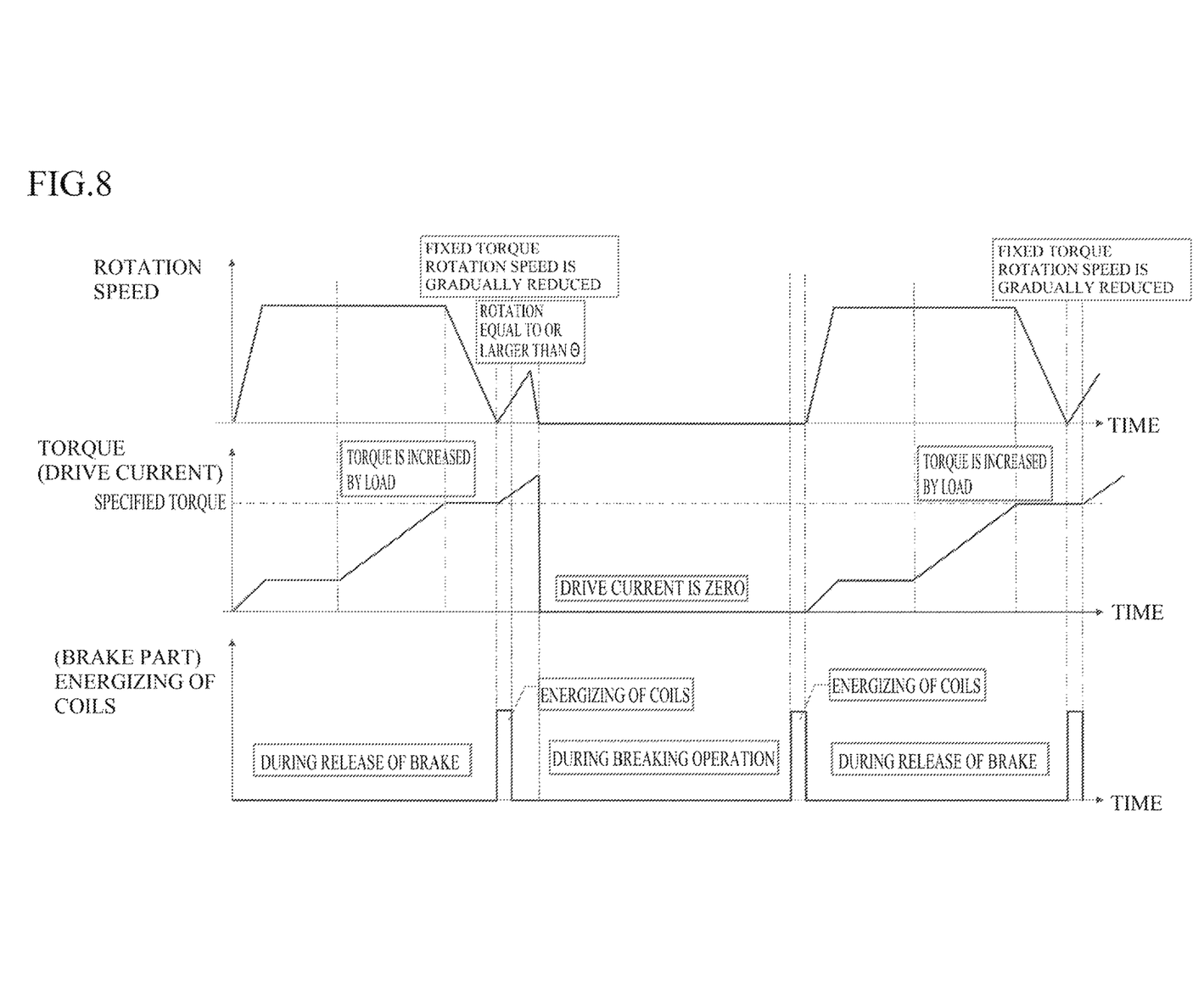
FIG. 8 is a timing chart showing the example of the braking operation according to another example.

Then, the movable meshing part 7 is held while being meshed with the motor meshing part 6; therefore, the motor rotation speed becomes zero, and the rotation torque also becomes zero as shown in FIG. 8. As the movable meshing part 7 is attracted and held by the magnetic circuit formed by the permanent magnet 4f2 provided in the second fixed yoke 4e2, it is not necessary to continue energizing the first coil 4h1 and the second coil 4h2. It is desirable that the instruction for the braking operation is executed after the rotation stop instruction. That is because there is a danger of damage to the meshing parts unless the movable meshing part 7 is pressed onto the motor meshing part 6 while reducing the rotation speed of the motor 2.

When the rotation of the prescribed angle Δ is not detected in Step S19, the projecting parts 7a mesh with the recessed parts 6a. The controller 8 determines whether the releasing of the brake is instructed or not (Step S20). Specifically, when the rotation command is transmitted from the host device 10 or the input unit 11, the brake release operation is instructed to the brake controller 8b. The brake controller 8b energizes the first coil 4h1 and the second coil 4h2 of the brake mechanism 4 for a prescribed period of time (Step S21). At this time, the movable yoke 4d is attracted to the leg part 4e3 of the first fixed yoke 4e1, and the movable meshing part 7 moves along the guide shaft 4c and separated from the motor meshing part 6 as shown in FIG. 1D, thereby performing the brake release operation (Step S11). As the movable meshing part 7 is attracted and held by the magnetic circuit formed by the permanent magnet 4f1 provided in the first fixed yoke 4e1, it is not necessary to continue energizing the first coil 4h1 and the second coil 4h2. It is also possible to check the release of the brake by transmitting the rotation command to the rotation operation part 9b from the motor controller 8a to temporarily rotate the motor 2 forwardly and reversely.

The above motor with the brake 1 has been explained by using the inner-rotor type motor; however, it is possible to use an outer-rotor type motor. In addition to the brushless motors, other types of motors such as a brushed motor and an ultrasonic motor or driving sources may be adopted. The trochoidal type reduction gear is used as the reduction gear 3; however, it is not limited to this. For example, a planetary reduction gear may be adopted.

Furthermore, both the first coil 4h1 and the second soil 4h2 provided in the brake mechanism 4 are excited at the same time; however, any one of them may be excited.

What is claimed is:

1. A motor with a brake, comprising:
    a motor driven to rotate about a motor shaft;
    a reduction gear rotating an output shaft with reduced speed about an input shaft drive-transmitted from the motor shaft through a gear mechanism;
    a brake mechanism including a motor meshing part integrally provided at the motor shaft on an opposite side of the reduction gear in an axial direction and a movable meshing part arranged opposite to the motor meshing part so as to be in contact with or separated from the motor meshing part; and
    a controller controlling a rotation operation of the motor and a braking operation of the brake mechanism;
    wherein the controller controls switching between a braked state in which the movable meshing part comes close to and meshes with the motor meshing part and a brake released state in which the movable meshing part is separated from the motor meshing part.

2. The motor with the brake according to claim 1, wherein the controller starts the motor through a motor controller in the brake released state in which the movable meshing part is separated from the motor meshing part, and executes the braking operation in which the movable meshing part of the brake mechanism is pressed onto the motor meshing part through a brake controller after transmitting an instruction for stopping motor rotation in a state in which the motor reaches a specified torque.

3. The motor with the brake according to claim 1, wherein the brake mechanism is an electromagnetic brake mechanism provided with a movable yoke with which the movable meshing part is integrally formed, a pair of fixed yokes in which both-side leg parts each having a U-shaped cross section are arranged so as to face the movable yoke through a gap, permanent magnets respectively arranged to parts of the respective fixed yokes so that same magnetic poles face each other, and a pair of coils wound in the same direction and arranged opposite to each other between the both-side leg parts of the respective fixed yokes so that air-core parts face the movable yoke, and
    the magnitude of attractive forces of the both-end leg parts of the pair of fixed yokes is changed by energizing at least any of the pair of coils to move the movable yoke with the movable meshing part in the axial direction and to perform switching between the state in which the movable meshing part meshes with the motor meshing part and the state in which the movable meshing part is separated from the motor meshing part.

4. The motor with the brake according to claim 3, wherein the meshing between the movable meshing part and the motor meshing part is released or the movable meshing part is allowed to mesh with the motor meshing part by energizing the first coil and the second coil at the same time or selectively.

5. The motor with the brake according to claim 1, wherein a plurality of recessed parts and projecting parts are provided on facing surfaces of the movable meshing part and the motor meshing part at a fitting angle $\theta$ in a circumferential direction, and
    the controller checks the fitting between the recessed parts and the projecting parts by detecting a rotation of a prescribed angle $\Delta$ smaller than the fitting angle $\theta$ by the motor controller after the controller instructs the braking operation to the brake mechanism through the brake controller.

* * * * *